(No Model.)
P. T. CONVIS.
HOLDBACK.
No. 348,953. Patented Sept. 14, 1886.
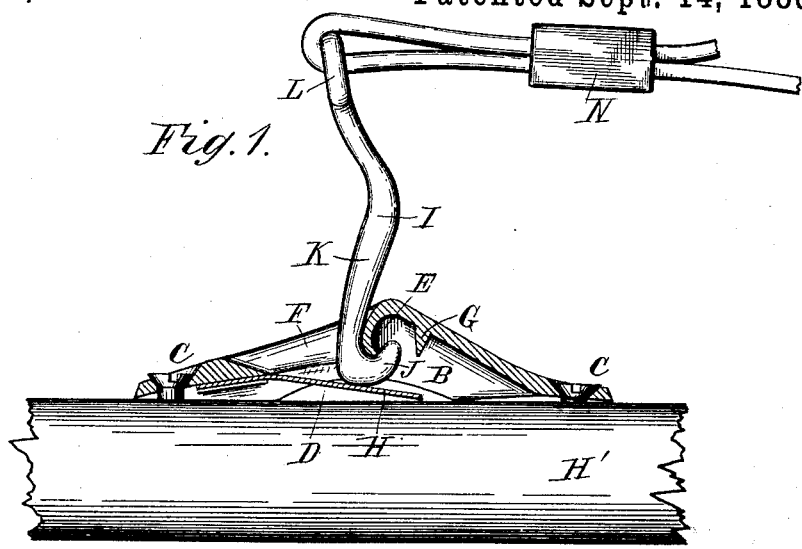
Fig. 1.
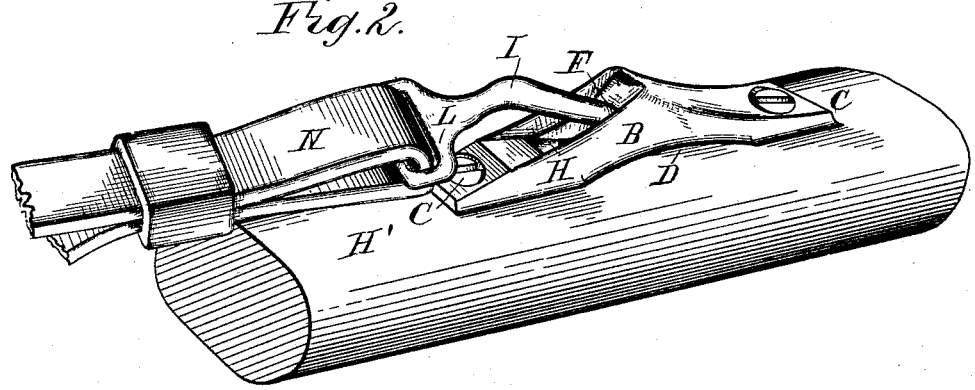
Fig. 2.
Fig. 3.
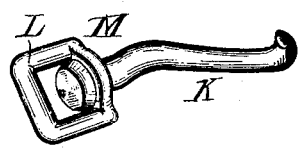
Witnesses.
Sam'l B. Dover,
William F. Winners
Inventor:
Perry T. Convis.
By Francis W. Parker
Attorney
N. PETERS, Photo-Lithographer, Washington, D. C.

UNITED STATES PATENT OFFICE.

PERRY T. CONVIS, OF FRANKFORT, INDIANA.

HOLDBACK.

SPECIFICATION forming part of Letters Patent No. 348,953, dated September 14, 1886.

Application filed February 11, 1886. Serial No. 191,571. (No model.)

*To all whom it may concern:*

Be it known that I, PERRY T. CONVIS, a citizen of the United States, residing at Frankfort, in the county of Clinton and State of Indiana, have invented a new and useful Holdback, of which the following is a specification.

My invention relates to holdbacks—such as are secured partly to the shaft of a buggy and partly to the breeching of a harness.

Its object is to provide a holdback which, when the parts are hooked together, will serve to keep the vehicle off the animal; but when the animal is loosened from the vehicle will automatically unhook themselves as he walks out of the shafts.

My invention is illustrated in the accompanying drawings, wherein Figure 1 is a sectional view of a holdback attached to a shaft and in process of being unhooked. Fig. 2 is a perspective of a holdback in position for use. Fig. 3 is a detail of the hook, showing the swiveled eye.

Like parts are indicated by like letters in all the figures.

H' is the shaft; B, the holdback body; C, the screws which secure it; D, a portion cut away at the middle of the lower edge of the side of the body.

E is an inner recess in the apex of the body, and above the opening F, which admits the hook.

G is a lug in front of the recess.

H is a spring in the bottom of the body.

I is a hook having the hook proper, J, and the stem K and eye I. The eye and stem may be swiveled, as at M. Of course this swivel can be made in any way.

N is the breeching-strap.

The use and operation of my invention are as follows: The body of the holdback is made as shown, and secured to the upper side of the shaft by screws or otherwise. It has an opening on its rear incline to receive the stem of the hook. In its apex is an aperture or recess to engage the hook proper, and at the front of this recess is a lug to prevent the hook from coming forward. The sides of the body below the apex are cut away, so as to give access to the interior thereof from below, to remove dirt and mud. A spring is secured along the bottom of the body to bear against the lower side of the hook-stem, and thus keep the hook in the recess. Of course the shape of the body and the shape, size, and character of the spring could be greatly changed without departing from the spirit of the invention.

The hook is composed of three parts—the hook proper, which engages the recess; the stem, which passes through the hole in the body, and the eye, which is swiveled to the stem and attached to the end of the breeching-strap. The swivel permits the breeching-strap to assume any position. With some kinds of harness the swivel is not necessary and can be dispensed with. When hitching up, it is only necessary to spring the hook into the recess. When unhitching, the animal can be driven out of the shafts after the tugs are unhooked, and the holdback will be carried into the position shown in Fig. 2 until it is automatically unhooked.

I claim and desire to secure by Letters Patent—

1. A holdback consisting of a body having an aperture in one side and an inner covered recess above the aperture, and a hook adapted to enter the aperture and engage the recess, so that the hook proper and recess when in use, are entirely covered, and thus free from the action of water, snow, and the like.

2. In a holdback, a body provided with an inner covered hook-receiving recess and a lug which engages the end of the hook and keeps the same from sliding forward out of place.

PERRY T. CONVIS.

Witnesses:
FRANCIS W. PARKER,
WILLIAM F. WIEMERS.